Figure 9:
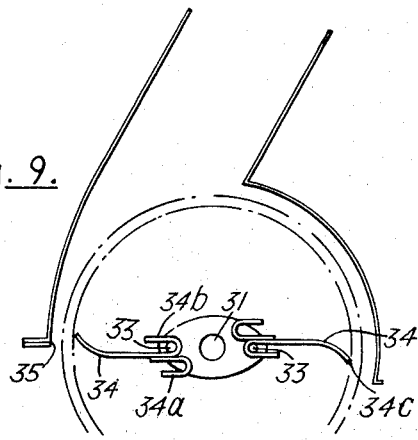

June 22, 1965   A. WENZEL ETAL   3,190,064
ROTARY CUTTING REEL WITH QUICK DETACHABLE FLAILS
Filed Dec. 31, 1963   2 Sheets-Sheet 1
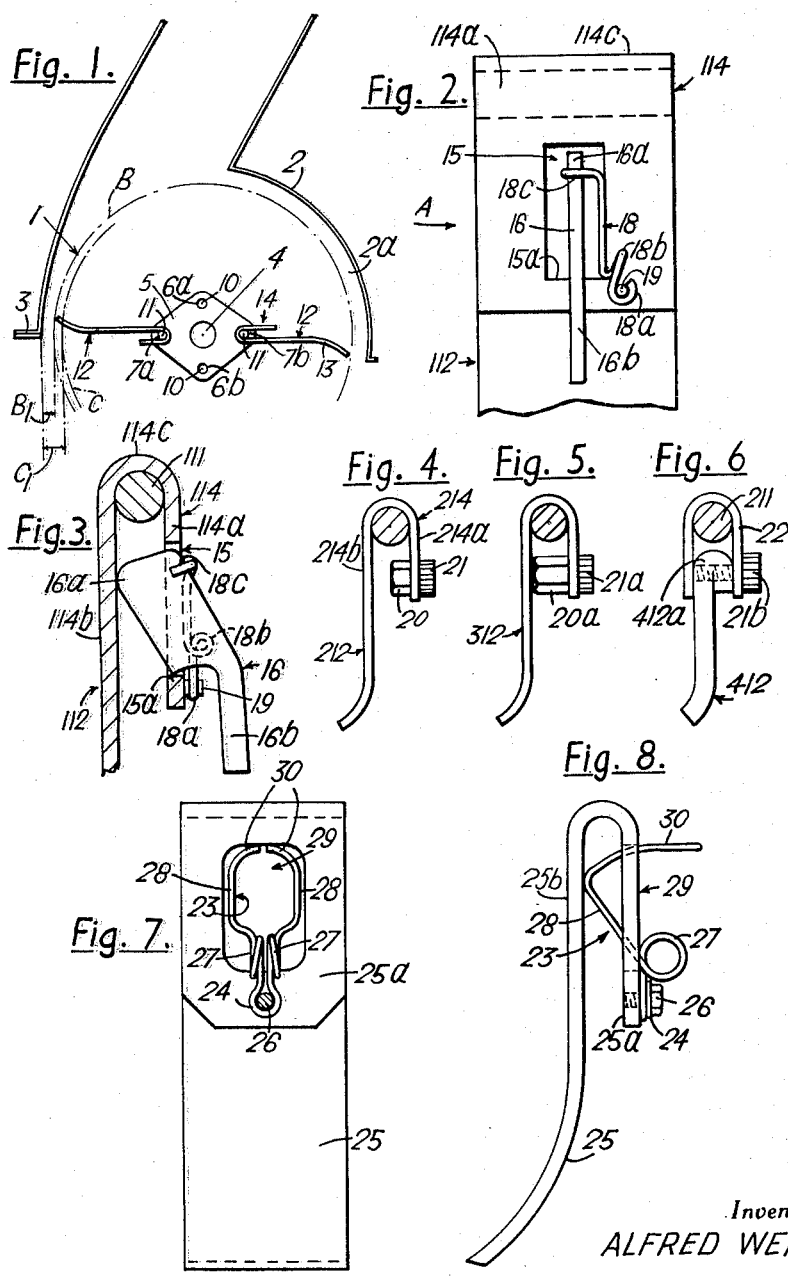
Inventor
ALFRED WENZEL
By Tweedale & Gerhardt
Attorneys.

Inventor
ALFRED WENZEL

United States Patent Office 3,190,064
Patented June 22, 1965

3,190,064
ROTARY CUTTING REEL WITH QUICK DETACHABLE FLAILS
Alfred Wenzel and Alwin Hantel, Eschwege, Germany, assignors to Massey-Ferguson G.m.b.H., Kassel, Germany, a company of Germany
Filed Dec. 31, 1963, Ser. No. 334,728
Claims priority, application Great Britain, Jan. 5, 1963, 609/63
8 Claims. (Cl. 56—294)

This invention relates to flail forage harvesters, and especially drums, flails and shafts therefor.

Flail forage harvesters at present usually comprise a plurality of flails each attached at one end to a driven shaft and having at the other end a blade tip of suitable shape, the tips of all the blades being equidistant from the axis of the shaft and being of such a width that the paths of axially adjacent blades overlap by a predetermined amount. On rotation of the shaft at high speed the flails all assume a radially extending position with respect to the axis of the shaft and the tips of all blades travel over and collectively define a substantially cylindrical path around the shaft from end to end thereof. The shaft, or other member or members serving a like function, and the flails are known collectively as a drum, and the diameter of the drum is to be understood as being the diameter of the cylindrical path mentioned above. By the term "shaft" is to be understood any suitable rotary support for the flails, which may be a shaft passing through the drum or, for example, stub axles or other mountings on the end of the drum. A second important operative part of a flail forage harvester is constituted by a fixed knife bar positioned closely adjacent the outer surface of the drum. The knife bar may comprise a specially sharpened bar of metal suspended at its ends and/or between them or it may comprise a reinforced portion of a housing extending transversely of the harvester closely adjacent the drum. The function of the cutter bar is to assist in chopping grass or hay by providing a reaction for holding the crop in position while it is chopped. If the crop is required to be chopped into very small pieces then the clearance gap between drum and knife bar is arranged to be small, and for larger pieces the gap is correspondingly widened.

According to the present invention we provide, in or for a flail forage harvester, a rotary drum comprising a shaft, flails, complementary coupling parts on the shaft and flails releasably connecting the flails to the shaft, and a further such alternatively selectible coupling part on the shaft and/or on a flail arranged to locate the flail with its outer tip at an operating radius from the shaft axis different from said radius when the first mentioned coupling parts are employed.

The coupling parts may comprise a first and second set of rods mounted on the shaft, parallel thereto, and a hook formation on each flail, all the rods in the first set being spaced from the shaft at one radius and all the rods in the other set being spaced from the shaft at another radius.

Alternatively, the coupling parts may comprise one set of rods mounted on the shaft, parallel thereto and all spaced therefrom at the same radius, and two hook formations at one end of each flail, the hook formations being located respectively at different distances from the other or outer end of the flails.

Further, according to the present invention we provide a flail for the rotary drum of a flail forage-harvester comprising a blade having alternatively selectible coupling parts thereon comprising two hooked formations located respectively at different distances from the other end of the blade.

Still further, according to the present invention we provide a flail forage harvester drum shaft having alternatively selectible coupling parts for flails, said parts comprising two sets of rods mounted on the shaft and extending longitudinally thereof and the rods in one set being located at a radius from the axis of the shaft different from the radius of the rods in the other set from said axis.

Preferably, the hook formations have finger-releasable lock means for holding the flails against accidental release from the shaft.

The diameter of the drum need not be the same all the way along its length nor need the paths of the flails overlap.

Figures 10, 11:
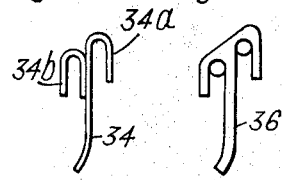
Figure 12:
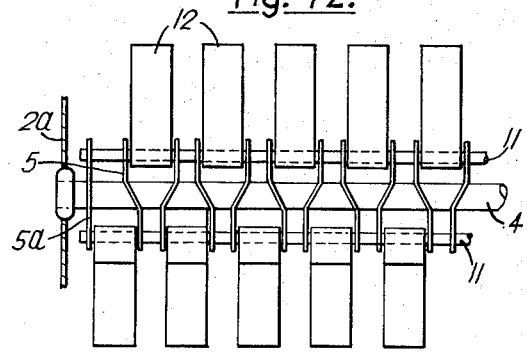

Embodiments of the invention will now be described, by way of example, with reference to the accompanying diagrammatic drawings, in which:

FIG. 1 is a fragmentary part sectional side view of a flail harvester according to one embodiment of the invention, FIG. 2 is a detail rear view to an enlarged scale of the coupling part of a flail for use in the embodiment shown in FIG. 1, FIG. 3 is a sectional side view corresponding to FIG. 2 in the direction of the arrow A in FIG. 2, FIGS. 4, 5 and 6 are side views of flails for use with the embodiment of FIG. 1 having different forms of lock means, FIGS. 7 and 8 are respectively rear and side views to a larger scale of a flail having a further different form of lock means, FIG. 9 is a view corresponding ot FIG. 1 showing a further embodiment of the invention, FIGS. 10 and 11 are side views of flails for use in the embodiment shown in FIG. 9, and FIG. 12 is a fragmenatry plan view corresponding to FIG. 1 with the casing removed.

Referring to FIG. 1 of the drawings, a flail drum 1 of a forage harvester has a housing 2 which fits closely about same and has a knife bar 3 at its front edge, A flail rotor 4 forming part of the drum 1 incudes a shaft 4 which is journalled at its ends in the end walls 2a of the housing 2 and a series of interspaced plates 5 through which the shaft 4 passes and is secured thereto, for example, by welding. The plates 5 are of generally diamond shape and each has two sets of holes 6a, 6b and 7a, 7b formed adjacent the apices of the diamond, the holes 6a, 6b being equispaced radially from the axis of the shaft 4, and the holes 7a, 7b being similarly equi-spaced at a wider radius, as shown. Each plate 5 is cranked, see FIG. 12, so as to displace each hole of each set axially on each side of a median line. Two mutually crossed plates (not shown) each cranked and having a set of holes punched in each, may alternatively be used. The plates 5a, FIG. 12, at the ends of the series are not cranked.

The holes 6a, 6b and 7a, 7b on all the plates 5 of the series are aligned and have sets of rods 10 and 11 respectively passed therethrough and forming one part of a coupling for attaching flails to the drum 1. Flails 12 each consists of a blade having a slightly cranked crop-engaging part 13 at one end and a complementary coupling part at the other end in the form of a hook 14. The hooks 14 slide over the bar 11 between the plates 5 and fit closely but loosely around same.

When the flails 12 are thus attached to the rods 11, and the harvester is in operation, the outer tips of the flails follow a substantially cylindrical path indicated by the chain-dotted line B in FIG. 1, the width of the gap between the tips of the flails 12 and the knife bar 3 being indicated at $B_1$. When it is desired to increase said gap, the flails 12 are unhooked from the rods 11 and are then hooked on to the rods 10. The tips of the flails 12 then follow a substantially cylindrical path indicated by the chain-dotted line C and the width of the gap is indicated at $C_1$.

During operation when the shaft 4 attains its operating speed, centrifugal force tends to hold the whirling flails in a radial position with respect to the shaft 4 and there is no tendency for them to become detached from the rods 10 or 11. When the harvester is at rest, however, there is a possibility that a flail may fall off in some positions. Lock means for each flail is therefore provided which need be strong enough only to carry the weight of a flail.

In one embodiment of lock means shown in FIGS. 2 and 3, a flail 112 is formed at its inner end with a hook portion 114 having spaced, substantially parallel legs 114a and 114b. Leg portion 114a is formed with a slot 15, a latch member 16 having a plate-like head portion 16a is pivoted on one edge 15a of the slot 15. A spring 18 has a hook 18a at one end which tightly engages a stud 19 projectitng from the hook portion 114a adjacent the slot 15. The spring 18 has a loop 18b intermediate its ends to give it added resiliency and the end 18c is cranked to engage the head 16a of the latch member to press it against the portion 114b of the hook 114. The flail 12 is attached to a rod 111 by positioning the hook 114 so that it straddles the rod and then by pulling the flail so that the head 16a of the latch 16 is pressed outwards to allow the rod to fit closely against the rounded portion 114c of the hook 114. The head 16a of the latch is then spring urged against the portion 114b to lock the flail 112 against accidental release. To release the flail 112 from the rod, a tail portion 16b projecting from head portion 16a of the latch is pressed down against the bias of spring 18 to withdraw head portion 16a from the space between legs 114a and 114b and the flail is simply manoeuvered off the bar.

In a further embodiment, the lock means consists of a plain nut 20, and a thumb-screw 21 passing through a hole or open-ended slot in the hook portion 214a, of the hook 214 of a flail 212, the nut 20 being of sufficient size partially to bridge the gap between the portions 214a and 214b of the hook as shown in FIG. 4, or completely to bridge the gap as shown in FIG. 5 in which the flail, nut and screw are indicated respectively at 312, 20a and 21a. Alternatively, the inner end of a flail 412 may be doubled back upon itself at 412a, FIG. 6, and have a tapped hole thereat engaged by a thumb-screw 21b which passes through a hole or open-ended slot in a U-shaped member 22 formed separately from the flail 412 and embracing a rod 211. In a modification of this alternative, not shown, the inner end of the flail 412 is flat and is not doubled over and carries a fixed nut for the screw 21b.

In a still further embodiment, FIGS. 7 and 8, a flail 25 is formed at its inner end with a hooked portion having legs 25a and 25b. The lock means consists of a torsion spring generally indicated at 23 and having at one end an eyelet 24 formed intermediate the ends of a coiled portion 27. The eyelet 24 is secured to the leg portion 25a of the hooked portion of flail 25 by a bolt 26. The coiled portion 27 of spring 23 has end portions 28 extending therefrom which are biased by coiled portion 27 to extend through a slot 29 in the leg 25a of the hook portion into the space between legs 25a and 25b and press against the adjacent wall of the flail 12. The portions 28 are bowed away from each other and extend into tail portions 30 which project back through the slot 29 and are bowed back towards each other so that the ends of the spring lie close together. In attaching the flail, the hooked end is pulled over a rod 10 or 11, FIG. 1, so that the rod depresses and then releases the spring portions 28 and nests between the closed end of the hooked end and the portions 30 of the spring. To release the flail, the portions 30 are pressed downwards and outwards by finger or thumb to move the portions 30 clear of the rod and the flail is then removed and the spring released.

In the embodiment shown in FIG. 9, the drum has a shaft 31 having a series of axially interspaced plates 32 fixed thereto, the plates 32 being elliptical and carrying only two rods 33 which are at the same radius from the axis of the shaft 31. The complementary coupling part of each flail 34 consists of a first hooked end 34a and a second hooked end 34b on the flail. The hooked end 34b is nearer the outer tip 34c of the flail than is the hooked end 34a so that, by attaching the flails to the rods 33 by one or the other of the said hooked ends, the gap between the tips 34c of the flails and the knife bar may be varied.

In FIG. 10, in which a flail 34 is shown by itself, it will be seen that the hooked end 34b is formed separately from the flail 34 as a U-shaped member and is secured thereto, for example, by welding. FIG. 11 shows a similar flail 36 in which both hooked ends are formed integrally with the flail.

The flails 34, 36 also have locked means (not shown) similar to that described with reference to the FIG. 2 to 8 embodiments. In each drum, the arrangement of the coupling between the flails and rods is such that there is some play between the rods and the lock means so that the flails may move within limits radially inwards towards the drum shaft if, for example, they strike a stone.

In FIG. 12, there is shown the effect of cranking the mounting plate 5, and that the path travelled by each flail 12 except the end ones, overlaps the path of the two adjacent and directly opposite flails.

The invention is not restricted to the use of two groups of flails and could be applied to a drum having three or more groups of blades.

As a result of the invention, flails may be easily fitted and removed and their effective operating length may be varied, all without the use of tools. Also any possibility of flails falling off the drum when the latter is at rest is substantially eliminated.

We claim:
1. In a flail drum assembly including a rotor having at least one pair of rods spaced from and parallel to the axis of rotation of the rotor and at least one flail rotatably coupled at its inner end to each rod for extending radially upon rotation of the rotor with the outer end of the flail defining a circular path about the axis of rotation of said rotor; a hook portion on the inner end of said flail having substantially parallel legs with said rod being received between said legs to rotatably couple the flail to the rod; a slot in one of said legs; and a releasable latch member mounted on said one leg and biased to a locking position in which it extends through said slot into the space between said legs to prevent passage of said rod from between said legs; said latch member being selectively movable to an unlock position in which it is removed from the space between said legs permitting the flail to be removed from said rod.

2. The construction defined in claim 1 in which said latch member comprises a plate-like head portion having one edge pivotally mounted on one edge of said slot for movement between the locked and unlocked positions; and further including a stud projecting from said one leg of said hook portion; and a spring having one end secured to said stud and its other end engaged with plate-like head portion at a position spaced from said one edge for biasing the latch member toward its locked position.

3. The construction defined in claim 1 wherein said latch member comprises a torsion spring having a coiled portion formed with an eyelet intermediate its ends secured to said one leg of said hook portion; leg portions extending from each end of said coiled portion and biased by said coiled portion to extend through said slot into the space between the legs of said hook portion; and tail portions on said end portions extending from the space between said legs through said slot to project from said one leg permitting the end portions to be removed from said space against the bias of said coiled portion.

4. In a flail forage harvester including a flail drum housing having end walls and a cover portion with front and rear edges extending between said end walls with a knife bar secured to one of said edges; a rotor journalled in said end walls; a set of rods including at least one pair of rods on said rotor, each rod of said pair being spaced equally on diametrically opposite sides of the axis of rotation of said rotor in parallel relationship with said axis of rotation; at least one flail rotatably coupled at its inner end to each rod of said pair for extending radially upon rotation of said rotor with the outer end of said flail defining a circular path about the axis of rotation of said rotor and passing said knife bar at a distance determined by the distance from the outer end of the flail to the rod on which it is mounted and the distance from the rod to the axis of rotation of the rotor; a hook portion on the inner end of the flail having substantially parallel legs with said rod being received between said legs to rotatably couple the flail to the rod; and a releasable latch member on one leg of said hook portion resiliently biased to a normal, locking position in which it projects into the space between said legs to prevent passage of said rod from between said hook legs, said latch member being selectively movable to an unlock position at which it is withdrawn from the space between said legs to permit separation of the rod from said hook portion.

5. The construction defined in claim 4 further including a second set of rods on said rotor; said second set of rods including at least one pair of rods, each rod of said pair being spaced equally on diametrically opposite sides of the axis of rotation of said rotor in parallel relationship with said axis of rotation; the rods of said second set of rods being spaced a different distance from the axis of rotation of the rotor than the rods of said other set, said flails being selectively movable from one set of rods to the other to vary the distance between the outer ends of the extended flails and said knife bar.

6. The construction defined in claim 4 further including a second hook portion on said flails having spaced, substantially parallel legs; said second hook portion being spaced from the inner end of the flail toward the outer end thereof whereby the radial distance between the axis of rotation of said rotor and the outer end of the extended flail can be selectively increased or decreased by engaging the rod with a selected one of the hook portions of the flail.

7. The construction defined in claim 4 further including a slot formed in one of said legs, said latch member comprising a plate-like head portion having one edge pivotally mounted on one edge of said slot and extending through said slot into the space between said legs in its locking position; a stud projecting from said one leg of said hook portion; and a spring having one end secured to said stud and its other end engaged with said plate-like head portion at a position spaced from said one edge for biasing the latch member toward its locked position.

8. The construction defined in claim 4 further including a slot in one of said legs; a latch member comprising a torsion spring having a coiled portion formed with an eyelet intermediate its ends secured to said one leg of said hook portion; end portions extending from each end of said coiled portion through said slot into the space between the legs of said hook portion; and tail portions on said end portions extending from the space between said legs through said slot to project from said one leg of the hook portion permitting the end portions to be removed from said space against the bias of said coiled portion.

References Cited by the Examiner

UNITED STATES PATENTS

| 2,538,230 | 1/51 | Boggs | 56—29 |
| 2,667,022 | 1/54 | Richey | 172—45 |
| 2,711,067 | 6/55 | Mott | 172—45 |
| 2,877,619 | 3/59 | Benson et al. | 172—45 X |

FOREIGN PATENTS

| 1,244,882 | 9/60 | France. |
| 878,206 | 9/61 | Great Britain. |

T. GRAHAM CRAVER, *Primary Examiner.*

ANTONIO F. GUIDA, *Examiner.*